United States Patent [19]
England

[11] Patent Number: 6,004,522
[45] Date of Patent: Dec. 21, 1999

[54] SOLID FILTRATION MEDIA INCORPORATING ELEVATED LEVELS OF PERMANGANATE AND WATER

[75] Inventor: William G. England, Suwanee, Ga.

[73] Assignee: Purafil, Inc., Norcross, Ga.

[21] Appl. No.: 08/887,449

[22] Filed: Jul. 2, 1997

Related U.S. Application Data

[63] Continuation of application No. 08/763,761, Dec. 11, 1996, abandoned, which is a continuation of application No. 08/448,891, May 24, 1995, abandoned, which is a continuation of application No. 08/167,664, Dec. 15, 1993, abandoned.

[51] Int. Cl.$^6$ .................................................. B01D 53/52
[52] U.S. Cl. ............................... 423/230; 422/5; 95/136; 210/758
[58] Field of Search ..................................... 423/210, 224, 423/230; 422/4, 5; 210/758; 95/136

[56] References Cited

U.S. PATENT DOCUMENTS

| | | | |
|---|---|---|---|
| 2,981,741 | 4/1961 | Brant et al. ............................. | 585/718 |
| 3,049,399 | 8/1962 | Gamson et al. ......................... | 422/4 |
| 3,226,332 | 12/1965 | Lincoln et al. ......................... | 502/439 |
| 3,391,988 | 7/1968 | Friess et al. ........................ | 423/244.03 |
| 3,421,837 | 1/1969 | Ebel et al. ............................. | 422/4 |
| 3,957,059 | 5/1976 | Rainer et al. ......................... | 131/267 |
| 4,072,479 | 2/1978 | Sinha et al. ........................... | 95/136 |
| 4,133,309 | 1/1979 | Kohler et al. ......................... | 502/415 |
| 4,155,358 | 5/1979 | McAllister et al. ................... | 128/146.6 |
| 4,215,096 | 7/1980 | Sinha et al. ............................. | 423/241 |
| 4,227,904 | 10/1980 | Kasmark, Jr. et al. ................. | 55/316 |
| 4,235,750 | 11/1980 | Cazalet .................................. | 422/177 |
| 4,273,751 | 6/1981 | Sinha et al. ........................ | 423/244.03 |
| 4,443,354 | 4/1984 | Eian ...................................... | 252/190 |
| 4,553,992 | 11/1985 | Boissinot et al. ...................... | 96/135 |
| 4,637,408 | 1/1987 | Rainer et al. ......................... | 96/153 |
| 4,699,681 | 10/1987 | Kasmark, Jr. et al. ................. | 156/264 |
| 4,763,674 | 8/1988 | Lelah ..................................... | 131/342 |
| 4,767,605 | 8/1988 | Lindbauer et al. ..................... | 423/239.1 |
| 4,797,318 | 1/1989 | Brooker et al. ........................ | 428/283 |
| 4,855,276 | 8/1989 | Osborne et al. ........................ | 502/415 |
| 4,859,438 | 8/1989 | Lindbauer et al. ................... | 423/239.1 |

(List continued on next page.)

FOREIGN PATENT DOCUMENTS

| | | | |
|---|---|---|---|
| 2209564 | 9/1973 | Germany .............................. | 423/224 |
| 57-1421 | 1/1982 | Japan ..................................... | 422/4 |
| 63-147518 | 6/1988 | Japan ................................... | 423/230 |
| 2-135046 | 5/1990 | Japan . | |
| 3-137917 | 6/1991 | Japan .................................... | 423/210 |

OTHER PUBLICATIONS

"Conference Report", Borg Warner Corporation, Research Center of Des Plaines, Illinois, and Kaiser Aluminum and Chemical Corporation of Baton Rouge, Louisiana, dated Jan. 11, 1960.

"Proposed Program for Stage I of Research at Colorado School of Mines Research Foundation" of Golden Colorado, for Marbon Chemical of Des Plaines, Ilinois, (No Date Given).

"Alumina Product and Technology From the People Who Make Them Work", LaRoche Chemicals, pp. 1–7.

"Odor Kontroller The Proven Solution to Indoor Contaminants", Air–Kontrol, Batesville, Mississippi.

*Primary Examiner*—Steven P. Griffin
*Assistant Examiner*—Peter DiMauro
*Attorney, Agent, or Firm*—Jones & Askew, LLP

[57] ABSTRACT

An improved filtration media, method of preparing the media, and method of treating a fluid stream with the media are disclosed. The improved media comprises a substrate having elevated levels of permanganate and water in one embodiment. More specifically, the improved media comprises a porous substrate impregnated with at least approximately 5% permanganate, and at least approximately 10% water, by weight. In another embodiment, the media further comprises sodium bicarbonate. Improved efficiency of removal of undesirable compounds such as hydrogen sulfide is achieved.

12 Claims, 1 Drawing Sheet

U.S. PATENT DOCUMENTS

| | | | |
|---|---|---|---|
| 4,943,394 | 7/1990 | Lammertz et al. | 588/4 |
| 4,963,166 | 10/1990 | Hoyt et al. | 96/132 |
| 4,963,431 | 10/1990 | Goldstein et al. | 428/288 |
| 5,059,405 | 10/1991 | Watson et al. | 423/210 |
| 5,124,177 | 6/1992 | Kasmark, Jr. et al. | 427/202 |
| 5,129,919 | 7/1992 | Linnersten | 55/274 |
| 5,212,131 | 5/1993 | Belding | 502/414 |
| 5,278,112 | 1/1994 | Klatte | 502/62 |
| 5,338,340 | 8/1994 | Kasmark, Jr. et al. | 96/135 |
| 5,383,236 | 1/1995 | Sesselmann | 2/243.1 |
| 5,417,743 | 5/1995 | Dauber | 96/13 |
| 5,500,038 | 3/1996 | Dauber et al. | 96/135 |
| 5,525,296 | 6/1996 | Hollinger, Jr. | 423/40 |

SOLID FILTRATION MEDIA INCORPORATING ELEVATED LEVELS OF PERMANGANATE AND WATER

This is a continuation of application Ser. No. 08/763,761 filed Dec. 11, 1996, abandoned, which is a continuation of application Ser. No. 08/448,891 filed May 24, 1995, abandoned, which is a continuation of application Ser. No. 08/167,664, filed Dec. 15, 1993, abandoned.

TECHNICAL FIELD

The present invention relates generally to an improved composition and method for the removal of compounds having toxic or corrosive properties or disagreeable odors, especially sulfur containing compounds, from gaseous streams. The invention more particularly relates to the use in filter beds of an improved solid filtration media comprising a substrate impregnated with elevated levels of potassium permanganate and water. The media may also be impregnated with sodium bicarbonate. The media is improved in that it has a substantially higher capacity for the removal of the above compounds from gas streams than the media of the prior art. Further, the media contains significantly higher levels of potassium permanganate and water than thought to be efficacious in the prior art.

BACKGROUND OF THE INVENTION

Undesirable airborne compounds, including sulfur compounds, ammonia, formaldehyde, urea, carbon monoxide, oxides of nitrogen, mercaptans, amines, and ethylene, occur in a number of environments, where most are primarily responsible for the presence of disagreeable odors, or irritating or toxic gases. Such environments include petroleum treatment and storage areas, sewage treatment facilities, hospitals, morgues, anatomy laboratories, animal rooms, and pulp and paper production sites, among others. These undesirable compounds may be bacterial breakdown products of higher organic compounds, or byproducts of industrial processes.

Hydrogen sulfide ("$H_2S$"), a colorless, toxic gas with a characteristic odor of rotten eggs, is produced in coal pits, gas wells, sulfur springs, and from decaying organic matter containing sulfur. Controlling emissions of this gas, particularly from municipal sewage treatment plants, has long been considered desirable. More recently, protecting electronic apparatus from the corrosive fumes of these compounds has become increasingly important. Further, $H_2S$ is flammable.

Ammonia ("$NH_3$"), also a colorless gas, possesses a distinctive, pungent odor and is a corrosive, alkaline gas. The gas is produced in animal rooms and nurseries and its control also has long been considered desirable.

Chlorine ("$Cl_2$") is a greenish-yellow gas with a suffocating odor. The compound is used for bleaching fabrics, purifying water, treating iron, and other uses. Control of this powerful irritant is most desirable for the well-being of those who work with it or are otherwise exposed to it. At lower levels, in combination with moisture, chlorine has a corrosive effect on electronic circuitry, stainless steel and the like.

Formaldehyde ("HCHO") is a colorless gas with a pungent suffocating odor. It is present in morgues and anatomy laboratories, and because it is intensely irritating to mucous membranes, its control is desirable.

Urea ("$CH_4N_2O$") is present in toilet exhaust and is used extensively in the paper industry to soften cellulose. Its odor makes control of this compound desirable.

Carbon monoxide ("CO"), an odorless, colorless, toxic gas, is present in compressed breathing air. Oxygenation requirements for certain atmospheres, including those inhabited by humans, mandate its control.

Oxides of nitrogen, including nitrogen dioxide ("$NO_2$"), nitric oxide ("NO"), and nitrous oxide ("$N_2O$"), are compounds with differing characteristics and levels of danger to humans, with nitrous oxide being the least irritating oxide. Nitrogen dioxide, however, is a deadly poison. Control of pollution resulting from any of these oxides is desirable or necessary, depending on the oxide.

Mercaptans and amines, including methyl mercaptan ("$CH_3SH$"), butyl mercaptan ("$C_4H_9SH$") and methyl amine ("$CH_5N$"), are undesirable gases present in sewerage odor. The control of these gases is desired for odor control.

Ethylene ("$C_2H_4$") is a colorless, flammable gas that is a simple asphyxiant which accelerates the maturation or decomposition of fruits, vegetables, and flowers. Control of this compound prolongs the marketable life of such items.

Attempts have been made to provide solid filtration media for removing the undesirable compounds listed above from fluid streams. Desired features of such media are a high total capacity for the removal of the targeted compound, a high efficiency in removing the compound from an air stream contacting the media, and a high ignition temperature (non-flammability).

The following approximate formulation is an example of a solid filtration media produced by the current state of the art: 69% activated alumina, 10% water, 4.5% potassium permanganate, and 17% sodium bicarbonate. The above solid filtration media is widely known in the art to have approximately a 9% capacity for the uptake of hydrogen sulfide gas in a gas stream.

One specific example of a solid filtration media for the removal of undesirable compounds from gas streams is described in U.S. Pat. No. 4,235,750. The '750 patent discloses an apparatus and method for adsorbing ethylene and other gaseous contaminants, wherein the apparatus is a three-part container comprising permanganate impregnated alumina in one compartment, activated carbon in the second compartment, and a mixture of molecular sieves and activated silica gel in the third compartment. The '750 patent discloses that the concentration of the aqueous potassium permanganate solution used to impregnate the alumina should be limited to one pound of permanganate dissolved in one gallon of water since if more is dissolved, the pores of the alumina will be clogged, therefore reducing its oxidizing capacity. Ideally, the potassium permanganate and water solution is applied to the substrate so that the dried, finished product contains about 4 to 5%, preferably 4.5% of potassium permanganate by weight of the finished product. Also, the '750 patent teaches that water is simply a diluent which will eventually be evaporated, and therefore, is not meaningful except as a vehicle for application of the potassium permanganate to the basic alumina substrate. The product is deemed finished after a substantial portion of the free water has been evaporated. Preferably, the alumina is dried to remove 99% of the free water after the aqueous potassium permanganate solution has been applied to the alumina.

Although the '750 patent discloses a potassium permanganate impregnated alumina for the removal of undesirable compounds from fluid streams, the capacity of the impregnated alumina is limited. The efficiency of the permanganate impregnated alumina of the '750 patent is limited as its optimal concentration of permanganate is 4.5%, and higher concentrations of permanganate results in the clogging of the pores of the substrate and therefore its oxidizing capacity being reduced. Accordingly, this filtration media would be limited to approximately a 9% capacity for the uptake of hydrogen sulfide gas in a gas stream. Therefore, this filtration media could not be efficiently used in small filter beds as larger quantities of the impregnated alumina must be used to compensate for its limited capacity. Further, the use of the impregnated alumina of the '750 patent would be more costly as the media would have to be replaced more frequently, thereby incurring the cost of more frequently purchasing the media and also incurring the cost of the additional labor required for its more frequent replacement. Finally, the permanganate impregnated alumina of the '750 patent is limited in that the failures in the adsorption of contaminants in fluid streams which occur at the end of the useful life of the media would be more frequent due to the limited capacity of the media. Therefore, the media of the '750 patent could not practically be utilized in systems where the air quality is critical.

Another example of a solid oxidizing system in pellet to form consisting of activated alumina ("$Al_2O_3$") impregnated with potassium permanganate ("$KMnO_4$") is described in U.S. Pat. No. 3,049,399. The pellets disclosed in the '399 patent provide air purification and odor control by both adsorbing and absorbing odors, and then destroy the collected odors by the potassium permanganate's controlled oxidizing action. Apparently, the permanganate destroys odors by the following oxidation reactions:

$$MnO_4^- + 8H^+ + 5e^- \rightarrow Mn^{+2} + 4H_2O \text{ (acid)}$$

$$3MnO_4 + 2H_2O \rightarrow MnO_2 + 2MnO_4 + 4OH \text{ (alkaline)}$$

$$MnO_4^- + 2H_2O + 3e^- \rightarrow MnO_2 + 2H2O \text{ (neutral)}$$

Because the permanganate will not ionize to release the active permanganate ion unless water is present, the substrate must be hydrophilic and the reaction must take place in normal ambient humidity. The '399 patent teaches that the amount of water necessary to cause the oxidation reaction is supplied by a normal ambient humidity. There is no teaching or suggestion in the '399 patent to elevate the amount of free water in the pellet. Further, there is no teaching or suggestion in the '399 patent to elevate the concentration of permanganate in the pellet above that obtained with the 5% aqueous solution of permanganate.

The potassium permanganate impregnated alumina pellets of the '399 patent are limited in that they have a limited capacity for removing undesired contaminants from gas streams. In one specific example in the '399 patent, the adsorbent was impregnated with a 5% aqueous solution of the permanganate and subsequently dried. No particular concentration range of potassium permanganate or water is disclosed for the pellets of the '399 patent. As the '399 patent does not teach or suggest elevated concentrations of permanganate or free water in its pellets, the potassium permanganate impregnated alumina of the '399 patent appears to have the same limitations as the potassium permanganate impregnated alumina of the '750 patent as discussed above.

Yet another example of a solid filtration media for removing undesirable compounds from a gas stream is disclosed in U.S. Pat. No. 3,226,332. The '332 patent teaches a method of producing granular activated alumina uniformly impregnated with a solid oxidizing agent, preferably potassium permanganate, for use in treating fluid streams. This method includes the spray addition of the impregnate, wherein the impregnate solution is sprayed onto the dry combination being tumbled in a mixer thereby forming pellets which are later dried to remove a substantial portion of the remaining water. The preferred impregnated concentration of potassium permanganate is 2.5%, by dry weight. The '332 patent discloses a range of 0.5 to 10% of potassium permanganate, from about 2% to about 4% of potassium permanganate being preferred. The '332 patent also discloses that the pellets are dried to remove at least a substantial portion of the uncombined (free) water.

Although the permanganate impregnated alumina of the '332 patent may contain approximately 0.5 to 10% potassium permanganate, the preferred range of potassium permanganate remains at from about 2% to about 4%. Accordingly, if the concentration of the potassium permanganate in the solid substrate is above 4%, it does not appear that the patentee expects any significant improvement over its capacity at a concentration of 4%. Also, the '332 patent does not teach elevating the amount of water remaining in the substrate. Further, there is no teaching in the '332 patent of how to avoid clogging of the pores of the substrate as expected from the high concentration of potassium permanganate. Accordingly, the potassium impregnated alumina as taught in the '332 patent would be expected by one skilled in the art to be limited in its capacity for the removal of undesirable compounds from fluid streams, and therefor has the same shortcomings as the potassium impregnated alumina of the '750 patent as discussed above.

As seen above, it is believed in the prior art that the adsorptivity of permanganate impregnated alumina is maximized when the concentration of the potassium permanganate impregnated in the alumina is approximately 4–5%. It is further taught that at concentrations above 5%, the potassium permanganate crystallizes and plugs the pores in the media, and therefore does not increase and may even decrease the adsorptivity of the media.

For example, in a study entitled "Proposed Program For Stage I of Research at Colorado School of Mines Research Foundation" of Golden Co., for Marbon Chemical of Des Plaines, Ill., it was found that the acceptable range of $MnO_4^-$ in alumina pellets was between 2.5 to 3.0%, calculated as $MnO_4^-$ ion weight percent of the oven-dry alumina. The 3.0% cut-off was based on prior experience where attempts to store greater amounts of $MnO_4^-$ in the pellets resulted in pore-plugging by small crystals of $KMnO_4$.

Also, in a conference report between Borg Warner Corporation Research Center of Des Plaines, Ill., and Kaiser Aluminum and Chemical Corporation of Baton Rouge, La., dated Jan. 11, 1960, regarding a cooperative R&D program on substrate improvement, it was concluded that a permanganate ("$MnO_4^-$") concentration of 2.0% (dry basis) appeared to be optimum. It was also concluded that for production purposes it would be better to aim for 1.75 to 2.00% since it was thought that the tendency toward pore-plugging increases very rapidly above 2%.

Also, as seen above, it is believed that the concentration of water should be minimized in solid filtration media. In fact, the industry continues to minimize the water content of such media. The resistance towards increasing the concentration of water in alumina filtration media results from the belief that the activity of the media is directly related to its surface area and pore size. Significantly increasing the water content would therefore be expected to reduce the surface area available for adsorption of contaminants, and therefore decrease the media's efficacy.

Although there are a variety of permanganate impregnated substrate known in the art for removing undesirable contaminants from fluid streams, as demonstrated above, these known impregnated substrates all have a limited capacity for the removal of undesirable compounds from gas streams, and therefore have limitations and drawbacks in their use, and do not meet the needs of various industries.

Therefore, what is needed is a high efficiency, high capacity, low flammability permanganate impregnated substrate for the removal of undesirable compounds from gas streams. Further, this impregnated substrate needs to be long lasting, requiring fewer replacements and thereby minimizing replacement and maintenance costs. Also needed is a high capacity impregnated substrate which may be used in small filter beds, and therefore may allow the treatment of fluid streams where there are significant space limitations.

SUMMARY OF THE INVENTION

The present invention relates to an improved solid filtration media, method of preparing the same, and method of treating a fluid stream with the solid filtration media. The improved solid filtration media comprises permanganate, water, and a substrate, such as activated alumina. Sodium bicarbonate may also be added. As shown above, in the filtration media of the prior art the free water content is minimized, and the potassium permanganate concentration is maintained at approximately 4 to 5% to avoid pore-clogging problems. In direct contrast to the prior art, the media of the present invention contains significantly higher levels of permanganate and water. An improved efficiency of removal of compounds such as hydrogen sulfide is achieved by this media. For example, the improved media of the present invention has a hydrogen sulfide capacity of greater than approximately 15%, whereas the media produced by the current art has a maximum hydrogen sulfide capacity of approximately 9–10%.

The prior art does not teach or suggest the discovery of the present invention, namely an improved permanganate impregnated substrate having elevated levels of both permanganate and water. No comparably effective combination of the materials of the present invention is taught or suggested in the prior art.

The present invention addresses an existing need in the prior art by providing a high efficiency, high capacity, low flammability permanganate impregnated substrate for the removal of undesirable contaminants from gas streams. The present invention therefore provides a long lasting filtration media which needs to be replaced less frequently and therefore minimizes maintenance and replacement costs. Also provided by the impregnated substrate of the present invention is a high capacity filtration media which may be used in small filter beds, and therefore may allow the treatment of fluid streams where there are significant space limitations. The present invention further provides methods of making and using the filtration media.

The filtration media of the present invention has a higher efficiency and capacity to remove certain undesired compounds from gaseous streams than do the media in the prior art. Further, the improved media of the present invention yields an equivalent capacity as activated carbon adsorbents. However, the filtration media of the present invention is much less expensive, and is considerably less flammable than activated carbon adsorbents.

Generally described, the present invention provides an filtration media comprising at least approximately 5% permanganate salt, at least 10% water, and a porous substrate, wherein these percentages are by weight of the composition. Preferably, the permanganate salt is potassium permanganate. The porous substrate is selected from the group consisting of activated alumina, silica gel, zeolite, adsorbent clay, kaolin, and activated bauxite, the preferred porous substrate being alumina.

Preferably, the improved solid filtration media of the present invention comprises between approximately 5 and 12% permanganate salt, between approximately 10 and 35% water, and a porous substrate, wherein the above percentages are by weight of the composition.

In another embodiment of the present invention, the composition further comprises sodium bicarbonate, wherein the sodium bicarbonate is between approximately 0 to 30%, and preferably is between 15 to 20% by weight. The sodium bicarbonate enhances the retention of water in the solid filtration media.

The present invention also provides a method of preparing an improved filtration media composition. This method comprises the steps of mixing water, a permanganate salt, and a substrate, and then forming the mixture into at least one cohesive porous unit. The unit is then cured at a temperature of from about 100° F. to about 200° F., until the concentration of water is at least about 10% by weight of the composition, and the concentration of the permanganate salt is at least about 5% by weight of the composition.

Preferably, the method of the present invention comprises forming an aqueous solution comprising the permanganate salt and then mixing the aqueous solution with the porous substrate. In an alternative aspect of the invention, the method of the present invention comprises forming a dry mixture comprising the permanganate salt and the substrate, and then adding water to the dry mixture. In yet another aspect of the invention, the method of the present invention comprises forming a dry mixture comprising the permanganate salt and the substrate, forming an aqueous solution comprising the permanganate salt, and then mixing the aqueous solution with the dry mixture. Optionally, sodium bicarbonate may be added either to the dry mixture, to the water, or to both in the method of preparing the filtration media.

Preferably, in the method of the present invention, the unit formed is cured until the concentration of water is from about 10 to about 30% by weight of the composition, and the concentration of the permanganate salt is from about 5 to about 12% by weight of the composition. Preferably, where sodium bicarbonate has been added to the composition, the unit formed is cured until the concentration of sodium bicarbonate is between 15 to 20% by weight.

Yet another aspect of the present invention is a method of treating a contaminated fluid stream with the improved solid filtration composition of the present invention. This method comprises contacting the contaminated fluid stream with the improved solid filtration composition.

The improved filtration media embodying the present invention, the method of its preparation, and the method of its use provide improved efficiency and capacity in removing contaminants from gas streams.

Accordingly, it is an object of the present invention to provide an improved solid filtration media for removing undesirable compounds from an air stream.

It is another object of the present invention to provide a solid filtration media having a high efficiency in removing unwanted compounds from an air stream flowing over or through the media.

It is yet another object of the present invention to provide a solid filtration media having a high ignition temperature, and therefore, limited flammability.

It is also an object of the present invention to provide an improved solid filtration media that is inexpensive to manufacture and use.

It is a further object of the present invention to provide a solid filtration media having a high total capacity for the removal of an undesirable compound.

It is another object to provide a solid filtration media so efficient and having such a high capacity for removing undesirable compounds that less media needs to be utilized, therefore allowing the use of smaller air filtration units.

It is yet another object to provide a method of is making an improved solid filtration media having a high efficiency and a high total capacity for the removal of an undesirable compound.

It is a further object to provide a method of treating a contaminated air or gas stream with an improved solid filtration media.

These and other objects, features and advantages of the present invention will become apparent after a review of the following detailed description of the disclosed embodiments and the appended claims.

DETAILED DESCRIPTION OF THE INVENTION

Figure 1:
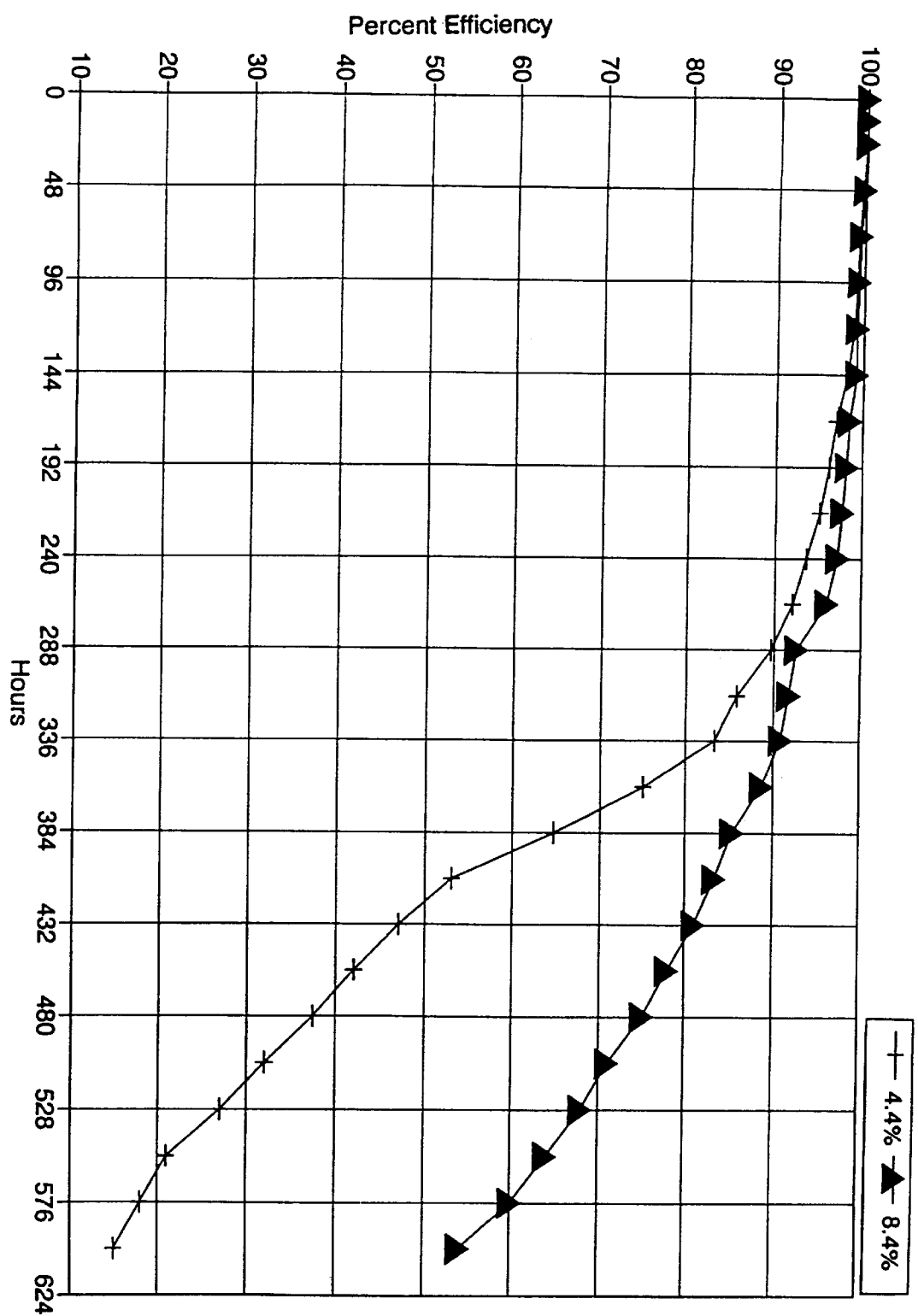
FIG. 1 is a graph representing the efficiency of removal of hydrogen sulfide by media comprising either 4.4% or 8.4% potassium permanganate, as described more fully in Example 7.

The present invention relates to an improved solid filtration media, method of preparing the same, and method of treating a fluid stream with the solid filtration media. The improved solid filtration media comprises permanganate, water, and a substrate, such as activated alumina. Sodium bicarbonate may also be added. The media contains significantly higher levels of permanganate and water than thought possible in the prior art. An improved efficiency of removal of compounds is achieved by this media. For example, a preferred embodiment of this improved media has a hydrogen sulfide capacity of greater than approximately 15%, whereas the media produced by the current art has a maximum hydrogen sulfide capacity of approximately 9–10%.

Generally described, the present invention provides an improved filtration media comprising a substrate impregnated with high levels of both permanganate, and water. The filtration media comprises at least approximately 5% permanganate salt, is and at least 10% water, by weight of the composition. The permanganate salt may be selected from the group consisting of, but not limited to, potassium permanganate ("$KMnO_4$"), sodium permanganate, magnesium permanganate, calcium permanganate, barium permanganate, and lithium permanganate. Preferably, the permanganate salt is potassium permanganate (Aldrich, Milwaukee, Wis.). The concentration of the potassium permanganate is between approximately 5 and 12%, and preferably between 7 and 12%.

The porous substrate may be selected from the group consisting of, but not limited to, activated alumina ("$Al_2O_3$") (LaRoche Chemical, Baton Rouge, La.), silica gels (J. M. Huber, Chemical Division, Havre De Grace, Md.), zeolites (Steel Head Specialty Minerals, Spokane, Wash.), kaolin (Englehard Corp., Edison, N.J.), adsorbent clays (Englehard Corp., Edison, N.J.), and activated bauxite. A preferred porous substrate is alumina. Preferably, the concentration of substrate in the filtration media is between 40 and 80%, and most preferably it is between 60 and 75% where the media does not contain sodium bicarbonate, and it is preferably between, 40 and 60% where the media contains sodium bicarbonate.

The concentration of water in the filtration media is between approximately 10 and 35%, preferably between 20 and 25%. One of ordinary skill in the art will understand that the concentration of free water in the filtration media may be altered by the conditions present, such as the humidity and the temperature, during its storage and use.

Preferably, the improved solid filtration media of the present invention comprises between approximately 5 and 12% potassium permanganate, between approximately 10 and 35% water, and between approximately 40 and 80% alumina, by weight of the composition. Most preferably, the improved solid filtration media comprises between approximately 7 and 12% potassium permanganate, between approximately 20 and 25% water, and between approximately 60 and 75% alumina, by is weight.

In another embodiment of the present invention, the composition further comprises sodium bicarbonate ("$NaHCO_3$") (Rhone-Poulenc, Chicago Heights, Ill.), wherein the concentration of sodium bicarbonate is between approximately 0 to 30%, and preferably is between 15 to 20%, by weight. The sodium bicarbonate enhances the retention of water in the filtration media. In the embodiment where the filtration media comprises sodium bicarbonate, the preferred concentration of alumina is between approximately 40 and 60%.

It is to be understood that when referring to the relative weight of components, the water referred to in the present specification, examples, and tables is defined as the free water, and does not include the bound water in the substrate. Free water is driven off by an oven at approximately 200° F., but if left in the substrate it is available for the oxidation reaction. In contrast, bound water is not driven out or evaporated except by a kiln at 1800 to 2000° F., and the bound water functions by holding the substrate together. Bound water is not available for reaction with the undesirable contaminants.

It is also to be understood that the term permanganate in the present specification, examples, and tables represents the permanganate salt, not the permanganate ion $MnO_4^-$. Therefore, the percent ranges of permanganates in compositions in the present specification denote the percent of the permanganate salt in the composition, not the percent of the permanganate ion in the composition.

Terms such as filtration media, adsorbent composition, and impregnated substrate are all interchangeable, and denote a substance which is capable of reducing or eliminating the presence of unwanted contaminants in fluid streams by the contact of such a substance with the fluid stream. It is to be understood that the term fluid is defined as a liquid or gas capable of flowing, and includes gaseous, aqueous, organic containing, and inorganic containing fluids.

The present invention also provides a method of preparing an improved solid filtration composition. This method comprises the steps of mixing water, a permanganate salt, and a substrate, and then forming the mixture into at least one cohesive porous unit. The unit is then cured at a temperature of from about 100° F. to about 200° F., until the concentration of water is at least about 10% by weight of the composition, and the concentration of the permanganate salt is at least about 5% by weight of the composition. The size and shape of the cohesive porous unit is not critical to the present invention. Any size and shape of a porous unit known in the art to reduce or eliminate undesirable contaminants from fluid streams when in contact with the unit may be used in the present invention. Preferably, the porous unit is a nominal ⅛" diameter round pellet.

The method of the present invention preferably comprises forming an aqueous solution comprising the permanganate salt and then mixing the aqueous solution with the porous substrate. To dissolve and maintain the permanganate salt in solution, the aqueous solution should be heated to approximately 160° to 200° F., and preferably to between approximately 180° to 190° F.

In another embodiment of the invention, the method of the present invention comprises forming a dry mixture comprising the permanganate salt and the substrate, and then adding water to the dry mixture. In yet another embodiment of the invention, the method of the present invention comprises forming a dry mixture comprising the permanganate salt and the substrate, forming an aqueous solution comprising the permanganate salt, and then mixing the aqueous solution with the dry mixture. Optionally, sodium bicarbonate may be added either to the dry mixture, to the water, or to both in the above methods of preparing the filtration media.

Preferably, in the method of the present invention, the unit formed is cured until the concentration of water is from about 10 to about 30%, and most preferably between 20 and 25%, by weight of the composition, and the concentration of the permanganate salt is from about 5 to about 12% by weight of the composition, and most preferably between 7 and 12%. Also, where sodium bicarbonate has been added to the composition, the unit formed is preferably cured until the concentration of sodium bicarbonate is less than approximately 30%, and preferably between 15 to 20% by weight.

In another embodiment of the present invention, the media may be cured at approximately 130° to 140° F. The presence of sodium bicarbonate allows for a lower curing temperature such as 130° to 140° F., in contrast to the prior art curing temperature of about 200° F.

The impregnation treatment of the activated starting material in accordance with the present invention has not been found to be critical with respect to the particular sequence in which the dry mix is impregnated with moisture and impregnates. The above combinations may be mixed in any manner which effectively produces the desired filtration media. Impregnation may be carried out simply by immersing and soaking the solid combination in a volume of impregnate solution. Also, the impregnate solution may be passed through the combination rather than being used as a static immersion treatment. However, it has been found that a preferred method of impregnation is spray addition in which an impregnate solution is sprayed onto a dry combination being tumbled in a mixer. This method of impregnation has been described in U.S. Pat. No. 3,226,332, which is herein incorporated by reference. Other methods of impregnating the combinations would suggest themselves as equally appropriate, and these are included within the scope of the present invention.

In one embodiment utilizing the above spray addition method, the aqueous impregnate solution of potassium permanganate is sprayed onto a dry combination of sodium bicarbonate and a substrate, such as activated alumina. For example, the dry combination would contain between approximately 80 to 85% activated alumina, and between approximately 15 to 20% of sodium bicarbonate.

The concentration of the potassium permanganate may vary in the solution to be sprayed onto the dry combination. For example, to produce a solid filtration medium containing approximately 7% potassium permanganate, an aqueous solution containing approximately 20% of potassium permanganate, at between approximately 160° F. to 200° F., and preferably at between 180° to 190° F., should be sprayed on the dry combination being tumbled in a mixer. Also, to produce a solid filtration medium containing approximately 10% potassium permanganate, a solution of approximately 25% potassium permanganate at between approximately 160° F. to 200° F., and preferably at about 180° F. to 190° F. should be sprayed on the dry combination being tumbled in a mixer. Any concentration of permanganate in the aqueous solution which is effective to yield the composition of the present invention may be used. Further, where the permanganate salt is either in the dry feed mixture or in both the aqueous solution and the dry feed mixture, any concentration of permanganate in the dry mixture and/or the aqueous solution which is effective to produce the composition of the present invention may be used. For example, the media may be used to fill perforated modules to be inserted into air ducts in a manner known in the art.

Yet another aspect of the present invention is a method of treating a contaminated fluid stream with the improved solid filtration composition of the present invention. This method comprises contacting the contaminated fluid stream with the above improved solid filtration compositions. Methods of treating gaseous or other fluid streams are well known in the art. As the method of treating fluid streams is not critical to the present invention, any method known in the art of treating fluid streams with the media of the present invention may be used.

The composition of the present invention is employed to remove undesired compounds from gas streams. The concentration of these undesirable compounds in the gas streams is not considered critical to the process of the present invention, nor is the physical and chemical makeup of the gas stream from which it is desired to remove undesirable compositions considered critical. Even concentrations of these undesirable compounds in gas streams resulting in levels lower than one ppb of the compounds passing through a solid filtration media bed per minute can be removed.

However, it has been found that flow rates of the gas stream being contacted with the bed of filtration media affect the breakthrough capacities of the media. The preferred flow rate is between 10 and 750 ft./min., and most preferably is between 60 and 100 ft/min., flowing perpendicularly to the face of the bed.

Also, it may be important that oxidizing conditions prevail, but it is not known to what extent oxidation may affect the purification achieved by the present invention. Typically, the undesired compositions will be removed from air, especially from air admixed with effluent gas streams resulting from municipal waste treatment facilities, paper mills, petrochemical refining plants, morgues, hospitals, anatomy laboratories, and hotel facilities, and so forth. The oxidizing conditions which may be important are generally that oxygen preferably be present in the gas stream being treated, at least in small amounts. This oxygen content is readily found in the gas stream, if air comprises a sufficient portion of the gas stream being treated. If oxygen is totally absent or present in insufficient amounts, oxygen may be independently introduced into the gas stream being treated. A number of factors affect the amount of oxygen which may be required for maximum removal of the contaminants in a gas stream in accordance with the present invention, including the concentration and absolute amount of compounds being removed from the gas stream being treated.

With respect to the amount of compound removed, it is believed that the following factors affect the process: the basic degree of attraction of the activated substrate for the compound; the pore structure and size of the substrate; the specific surface area of the substrate; the surface characteristics of the substrate; the amount of permanganate present; and the amount of water present.

The filtration media of the present invention is appropriately used alone in filter beds for the removal of undesirable compounds. It is also appropriate, however, to use the composition of the present invention in conjunction with filter beds containing other filtration media, and also in conjunction with mechanical or electrostatic filters. Any such additional filters may be placed either upstream (before the media of the present invention with respect to the effluent gas being treated) or downstream.

The above invention significantly increases the efficiency and capacity of impregnated porous substrates (filtration media) to remove certain undesired compounds from gaseous streams over the capacity of impregnated porous substrates of the prior art. Therefore, the lifetime of a specific quantity of the improved filtration media will be much longer than the same quantity of the currently available filtration media.

The extension of the lifetime of the filtration products will significantly reduce consumers' and businesses' purchasing, servicing, and installation costs. Also, the enhanced efficiency of the improved media allows for a new line of products which are compact versions of currently available units, but have the same performance as the larger, currently available units. The capability of creating significantly smaller filtration units is useful for providing efficacious air filtration in space-limited quarters which previously could not utilize the larger, currently available units.

Also, the improved permanganate media is less expensive than other filtration media having a roughly equivalent capacity. For example, the media of the present invention has an equivalent capacity as activated carbon adsorbents. However, the media of the present invention is considerably less expensive than activated carbon adsorbents.

Further, the filtration media of the present invention is safe as it is not flammable, in contrast to carbon containing filtration products. This aspect of the present invention is significant to industries which manufacture or process flammable, fume producing materials, such as the petroleum industry for example.

In media of the present invention, the increase in the concentration of the potassium permanganate and water in the solid filtration media has greatly increased the media's capacity for removing contaminants from air streams. As described earlier, the potassium permanganate impregnated alumina media of the prior art has a capacity for the removal of hydrogen sulfide of approximately 9–10%. In contrast, a composition of the present invention containing approximately 53% activated alumina, 23% water, 7% potassium permanganate, and 17% sodium bicarbonate, has a hydrogen sulfide capacity of approximately 15 to 17%.

The results of accelerated efficacy tests comparing the capacity of solid filtration media of the prior art and the solid filtration media described in this invention are fully discussed in Examples 5 and 6. For example, a prior art media which contained approximately 3.5–4.0% potassium permanganate, and 10–15% water, had a hydrogen sulfide capacity of approximately 7.5%. In contrast, the solid filtration media of the present invention, which contained approximately 7% potassium permanganate, and 15–20% water, had a hydrogen sulfide capacity of 15.9%. The efficacy tests were performed by challenging a known quantity of the selected solid filtration media with 1.0% hydrogen sulfide gas at a constant flow rate and monitoring the concentration of hydrogen sulfide in the gas stream exiting the solid filtration media. The accelerated efficacy test is fully described in Example 4.

The results of a non-accelerated test for the determination of performance characteristics such as removal efficiency and capacity for removal of various gas-phase air filtration media are discussed in Example 8, and are graphically illustrated in FIG. 1. The efficiency tests were performed on a solid filtration media of the prior art, and on a solid filtration media of the present invention. The media of the prior art comprised 4.4% potassium permanganate, 19.9% water, 17% sodium bicarbonate, and 58.7% alumina. The media of the present invention comprised 8.4% potassium permanganate, 24.4% water, 17% sodium bicarbonate, and 50.2% alumina. FIG. 1 illustrates the efficiency of hydrogen sulfide removal of each of the media over an extended period of time. As can be seen from FIG. 1, the media of the present invention has a percent efficiency of hydrogen sulfide removal of 96% at 260 hours, 78% at 456 hours, and 54% at 600 hours. In contrast, the media of the prior art has a hydrogen sulfide removal efficiency of approximately 92% at 260 hours, 42% at 456 hours, and 15% at 600 hours. The method of the efficiency test is fully described in Example 7.

Although the applicant does not know the precise mechanisms by which the improved media operates, and is not bound by the following theory, it is believed that the oxidation reactions between the permanganate and the undesirable contaminants occur primarily near the surface of the filtration media, rather than deep within its pores. Therefore it is critical that the surface's oxidative capabilities be continually regenerated. It is believed that the oxidative capability of the surface of the media is regenerated by the flow or migration of permanganate from the center of the media to the surface of the media while the products of the oxidation reactions flow or migrate from the surface of the media to the center of the media. It is also believed that the higher the concentration of permanganate at the surface of the media, the higher the capacity and efficiency of the media. Further, the fluidity of the permanganate solution directly affects the flow and thus the quantity of the permanganate reaching the surface of the media. Therefore, it is critical to maintain an elevated concentration of free water in the media so that the permangante solution maintains a high level of fluidity and readily flows to the surface of the media thereby maximizing the efficiency and capacity of the media. A liquid path thus should be established between the interior of the pores and the surface of the media. This is contrary to prior art theory which teaches a need for penetration of the gaseous contaminants into the pores of the substrate.

The above theory explains why the capacity and efficiency of the filtration media of the prior art could not surpass the capacity and efficiency obtained at the potassium permanganate concentrations of 4–5%. As stated above, in the prior art various attempts were made to impregnate the media with higher quantities of potassium permanganate. However, the majority of the free water has always been removed from the prior art media. As stated above, the efficiency and capacity of the highly impregnated media of the prior art remains constant or decreases relative to the capacity achieved by media impregnated with 4–5% permanganate. There are three reasons for the failure of the highly impregnated media of the prior art to obtain higher results. First, the high concentration of permanganate and the low concentration of water causes the permanganate to crystallize and clog the pores of the substrate thereby blocking the flow of permanganate to the surface of the media. Second, the crystallized permanganate remains in the center of the media and therefore cannot move to the surface of the media to oxidize contaminants. Third, it is difficult for any permanganate that may be in solution to move to the surface of the media as the permanganate solution is very concentrated and has a low level of fluidity. It is for these reasons that maintaining an elevated level of water in the media is believed to be critical for the improved filtration media of the present invention.

The following examples will serve better to illustrate the composition, the treatment methods of the present invention, and the capacity for the removal of contaminants in gas streams produced thereby. It should be noted that the continuous flow systems described in several of the following examples all were operated at a relative humidity of 40–50%.

EXAMPLE 1

A 7% potassium permanganate impregnated alumina composition is prepared as follows:

A dried feed mix is prepared by combining, by weight, 80 to 85% alumina, and 15 to 20% sodium bicarbonate. The dry feed mixture is sprayed with a heated aqueous potassium permanganate solution at 180 to 190° F. while the dried feed mix is being tumbled in a tumble mill. The resulting pellets are then dried at 130 to 140° F., until the pellets contain about 20 to 25% free water.

To prepare solid filtration media containing approximately 7% potassium permanganate, by dry weight, the aqueous potassium permanganate solution should preferably contain approximately 20% potassium permanganate by weight. It is to be understood that the aqueous potassium permanganate solution is sprayed on to the dry feed mix while the dry mix is rolled in the pelletizing disk as described in U.S. Pat. No. 3,226,332, incorporated herein by reference.

EXAMPLE 2

A 10% potassium permanganate impregnated alumina composition is prepared as follows:

A dried feed mix is prepared by combining, by weight, 80 to 85% alumina, and 15 to 20% sodium bicarbonate. The dry feed mixture is sprayed with a heated aqueous potassium permanganate solution at 180 to 190° F. while the dried feed mix is being tumbled in a tumble mill. The resulting pellets are then dried at 130 to 140° F. in air, until the pellets contain about 20 to 25% free water.

To prepare a solid filtration media containing approximately 10% potassium permanganate, by dry weight, the aqueous solution should preferably contain approximately 25% potassium permanganate, by weight. It is to be understood that the aqueous potassium permanganate solution is sprayed on to the dry feed mix while the dry mix is rolled in the pelletizing disk as described in U.S. Pat. No. 3,226,332, incorporated herein by reference.

EXAMPLE 3

Compositions of Permanganate Impregnated Substrates

Using the method described in Example 1 or Example 2, the following compositions, by dry weight, may also be prepared:

TABLE I

Composition of Solid Filtration Media

| Substrate | % Substrate | % $NaHCO_3$ | % $H_2O$ | % $KMnO_4$ |
|---|---|---|---|---|
| Alumina | 50 | 18 | 20 | 12 |
| Alumina | 50 | 20 | 20 | 10 |
| Alumina | 50 | 20 | 22 | 8 |
| Alumina | 65 | 8 | 15 | 12 |
| Alumina | 75 | 0 | 15 | 10 |
| Silica gel | 50 | 18 | 22 | 10 |
| Zeolite | 55 | 10 | 23 | 12 |
| Adsorbent Clay | 55 | 13 | 20 | 12 |

The dry feed mix is prepared by mixing appropriate amounts of the substrate and the sodium bicarbonate together. The dry feed mix is mixed in a tumbling mill with an appropriate amount of an aqueous potassium permanganate solution sprayed onto the dry feed mix while tumbling, in the manner described in U.S. Pat. No. 3,226,332. Curing is as in Example 1 or 2. The cured pellets are a strong, non-dusting filter media suitable for placement in filter beds. They provide an efficient media for the reduction or elimination of many undesirable compounds.

EXAMPLE 4

Standard Accelerated Test Method for Capacity Determination of Gas-Phase Air Filtration Media.

The following is an accelerated test method to be used for determining the capacity of removal of various gas-phase air filtration media when subjected to a flowing gas stream containing high levels of contaminant(s). Low-level challenge testing of gas-phase air filtration media, whether full-scale or small-scale, usually takes long periods of time to obtain the desired results. The following method provides an accelerated test for determining the removal capacities of various media by exposing them to high levels of contaminants.

The method is briefly summarized as follows: a known volume of media is placed in an adsorption tube and exposed to a known concentration (usually 1% # vol./vol.) of contaminant gas(es) in a tempered, humidified, clean air system. The gas stream is calibrated to deliver a total flow rate of 1450±20 ml/min. The removal capacity is calculated as the amount (in grams) of contaminant removed from the air stream per volume (cubic centimeters) of media at a 50 parts per million ("ppm") breakthrough.

More specifically, the air utilized must be tempered, humidified, clean, oil-free, and compressed. Accordingly, the air must be passed through a bed of activated carbon followed by a filter bed containing potassium permanganate impregnated alumina pellets. Each filter bed should contain at least 300 ml. (18.3 cu. in.) of media for each liter per minute (0.035 cfm.) of air flow. The media in each filter bed should be changed before each test.

Media samples are preferably obtained from unopened original manufacturer's shipping or storage containers chosen at random whenever possible. The entire container, whenever possible or practical, should be sampled by taking small amounts of media from throughout the container and combining them into one larger sample. The sample should be thoroughly mixed before being analyzed. Guidance on sampling may be obtained from ASTM Standard E300, entitled *Recommended Practice for Sampling Industrial Chemicals*. If a test is to be run comparing media of the same size or different sizes, the sample collected may be screened through the appropriate sieves to sort the media by size.

Using an appropriate sampling method, obtain a representative sample of media (approximately 400 grams should be sufficient) and determine its apparent density as per ASTM 2854, or an equivalent method. Obtain an adsorption tube which is a cylindrical tube where glass wool and/or beads are optionally placed below the media, and the media and optional glass wool or beads are supported by stainless steel mesh, a perforated slotted glass disc, or a perforated slotted ceramic disc positioned below the media and glass wool or beads. After the adsorption tube having the glass wool or glass beads has been calibrated for the volume of a known depth of media, weigh the adsorption tube to the nearest 1.0 mg. Fill the adsorption tube to the desired depth via alternately filling and gently tamping the tube to eliminate any dead space until the desired depth is reached. Weigh the filled adsorption tube to the nearest 1.0 mg.

The filled media tube is arranged such that a mixture of air and contaminated gas enters the bottom of the tube, flows through the glass wool or beads, flows through the filtration media, and is then analyzed by a gas analyzer. Leaks in the gas system should be checked for and eliminated before beginning the analysis of the sample. Rotameters, analyzers, recorders, etc. should be calibrated over appropriate ranges according to the manufacturer's instructions or other standard methods such as ASTM Standard D3195, before any media is introduced into the system. Also, air and gas flow requirements should be determined and checked against supply capabilities to assure proper air and gas flows to the system.

Once the adsorption tube is in position, start the flow of the mixture of contaminated gas and air and record the time, or time the test using a stop watch. Continue the flow of the mixture of gas and air until a breakthrough of 50 ppm is observed or indicated by the gas analyzer. Record the time at breakthrough. It is preferable to use a gas analyzer capable of variable scale readouts to 0 ppm (±5 ppm), having specific or multiple gas capabilities.

The data obtained from the above analysis will yield the gas capacity of the media tested using the following equation:

$$\text{GAS CAPACITY (GM/CC)} = \frac{(K \times 10^{-5})(C)(F)(t_b)}{V}$$

where:

$K$=1.52 for $H_2S$, 2.86 for $SO_2$, 3.17 for $Cl_2$, 2.15 for $CH_3SH$, 0.76 for $NH_3$, 2.05 for $NO_2$, and 1.39 for NO.

$C$=Concentration of challenge gas in airstream, Volume %.

$F$=Total stream flow rate, cc/min.

$t_b$=Time to 50 ppm breakthrough, minutes.

$V$=Volume of the adsorption tube media column, cc.

EXAMPLE 5

Capacity of Potassium Permanganate Impregnated Alumina Pellets.

The results of efficacy tests comparing the capacity of solid filtration media of the present invention are summarized in Table II below. The efficacy tests were performed by challenging a known quantity of the selected solid filtration media with 1.0% hydrogen sulfide gas at a constant flow rate and monitoring the concentration of hydrogen sulfide in the gas stream exiting the solid filtration media as described in Example 4.

Table II summarizes the content and the capacity of various permanganate containing, solid filtration media. Lot 01083-8 is currently available solid filtration media. Lots 01183-8 and 01223-8 are the improved solid filtration media of the present invention.

TABLE II

% $KMnO_4$ vs. $H_2S$ CAPACITY

| LOT # | % $KMnO_4$ | Crush | Abrasion | % $NaHCO_3$ | % $H_2O$ | % $H_2S$ Capacity |
|---|---|---|---|---|---|---|
| 01083-8 | 4.40 | 50.7 | 2.8 | 15–20 | 19.58 | 9.68 |
| 01183-8 | 5.43 | 51.9 | 1.9 | 15–20 | 24.48 | 11.06 |
| 01223-8 | 7.0 | 51.8 | 1.4 | 15–20 | 22.57 | 15.90 |

EXAMPLE 6

Capacity of Potassium Permanganate Impregnated Alumina Pellets.

Table III summarizes the content and the capacity of solid filtration media produced by several different manufacturers. Carus Chemical manufactured Lot 252 which contains no sodium bicarbonate, approximately 3.5 to 4% $KMnO_4$, and about 10 to 15% $H_2O$. Unisorb manufactured Mark II which contains no sodium bicarbonate, approximately 3.5 to 4% $KMnO_4$, and about 10 to 15% $H_2O$. The two media manufactured by Purafil are the improved solid filtration media of the present invention. The two Purafil media contain approximately 5.4% $KMnO_4$ and 7.0% $KMnO_4$, respectively.

TABLE III

COMPETITIVE MEDIA ANALYSIS OF
% $KMnO_4$ vs. $H_2S$ CAPACITY

| MEDIA | % $KMnO_4$ | % $NaHCO_3$ | % $H_2O$ | % $H_2S$ CAPACITY |
|---|---|---|---|---|
| Carus Chemical Lot 252 | 3.5–4 | 0 | 10–15 | 7.5 |
| Unisorb Mark II | 3.5–4 | 0 | 10–15 | 8.08 |
| Purafil 5.4% | 5.4 | 15–20 | 20–25 | 10.93 |
| Purafil 7.0% | 7.0 | 15–20 | 20–25 | 13.44 |

EXAMPLE 7

Standard Test Method For Determination Of Performance Characteristics Of Gas-Phase Air Filtration Media.

The following is a method of determining the performance characteristics (removal efficiency and capacity for removal) of various gas-phase air filtration media when subjected to flowing gas streams of known concentrations and velocities. This test provides a basis for comparing the characteristics of different media.

The method is briefly summarized as follows: a weighed media sample is placed in a glass tube and exposed to a known concentration of contaminant gas(es) in a tempered, humidified, clean air stream. The inlet and outlet gas concentrations are measured and recorded for use in determining media efficiency and capacity. The tests can be run until a media is exhausted or to a predetermined removal efficiency or percent capacity. All parameters are held constant, and all samples are run simultaneously (in parallel) until the test is completed. Operating parameters may be altered between tests to create simulated field conditions.

More specifically, the air utilized must be tempered, humidified, clean, oil-free, and compressed. Accordingly, the air must be passed through a bed of activated carbon followed by a filter bed containing potassium permanganate impregnated alumina pellets. Each filter bed should contain at least 300 ml. (18.3 cu. in.) of media for each liter per minute (0.035 cfm.) of air flow. The media in each filter bed should be changed before each test.

Media samples are preferably obtained from unopened original manufacturer's shipping or storage containers chosen at random if possible. The entire container, whenever possible or practical, should be sampled by taking small amounts of media from throughout the container and combining them into one larger sample. Also, the sample should be thoroughly mixed before being analyzed. Guidance on sampling may be obtained from ASTM Standard E300— entitled *Recommended Practice For Sampling Industrial Chemicals.* If a test is to be run comparing media of the same size or different sizes, the sample collected may be screened through the appropriate sieves to sort the media by size.

Using an appropriate sampling method, obtain a representative sample of media (approximately 400 grams should be sufficient) and determine its apparent density as per ASTM Standard 2854, or an equivalent method. Obtain an adsorption tube which is a cylindrical tube having glass wool and/or beads optionally placed below the media, and the media and optional glass wool or beads being supported by stainless steel mesh, a perforated slotted glass disc, or a perforated slotted ceramic disc positioned below the media and glass wool or beads. After the adsorption tube having the glass wool or glass beads has been calibrated for the volume of a known depth of media, weight the adsorption tube to the nearest 1.0 mg. Fill the adsorption tube to the desired depth via alternately filling and gently tamping the tube to eliminate any dead space until the desired depth is reached. Weigh the filled adsorption tube to the nearest 1.0 mg.

In the alternative, the amount of media placed in the tubes may be determined by filling the tube to the desired level of media while tamping gently to eliminate any dead space, removing the media from the tubes, weighing the media, and finally returning the media to the tube. This alternative method eliminates the need to determine the density of the media as required when filling the tube volumetrically.

The filled media tubes are then arranged in parallel such that the gas-air mixture will simultaneously flow through all of the media tubes. Also placed in parallel with the filled media tubes is one empty tube for challenging gas concentration, relative humidity, and temperature monitoring.

Leaks in the gas system should be checked for and eliminated before beginning the analysis of the media samples. Also, rotameters, analyzers, recorders, etc. should be calibrated over appropriate ranges according to the manufacturer's instructions or other standard methods such as ASTM Standard D3195, before any media is introduced into the system. Air and gas flow requirements should be determined and checked against supply capabilities to assure proper air and gas flows to the system.

With the air/gas lines disconnected from the media tubes, turn on the air and adjust the rotameters and the flow meters to give the desired flow rates. Next, turn on the challenge gas and set the delivery pressure to approximately five pounds above the system air pressure. Adjust to the desired concentration of the contaminant gas in the air stream by increasing or decreasing the flow through the rotameter/flow meter and verify the concentration with the appropriate analyzer. If a multiple gas challenge is being used, each gas challenge concentration should be set separately before combining the flows and the challenge tube. Interferences, both in the gas stream and on the analyzers, caused by the combining of multiple gases should be determined beforehand. The sample selector of the gas analyzer may optionally be set for sampling at predetermined intervals and durations.

The air/gas lines are then connected to the media tubes. Purified and humidified air is then mixed with the predetermined quantity of contaminant gas, and then the mixture passes through the tubes and is then analyzed by a gas analyzer. The filled media tubes are arranged such that the mixture of air and contaminated gas enters the bottom of the tube, flows through the glass wool or beads, flows through the filtration media, and is then analyzed by a gas analyzer.

At predetermined sampling intervals, record the outlet gas concentrations starting with the first media tube and ending with the challenge tube for each set of readings. Allow the analyzers to equilibrate between each tube and to zero after the challenge tube. After the initial set of readings (or when outlet gas concentrations are detected), adjust the media tube sampling order to start with the tube showing the lowest outlet concentration and move upward to the challenge tube. Each time allow for equilibration between media tubes and zeroing after the challenge tube.

If gas cylinders need to be changed before the test is complete, first disconnect the air/gas lines to the media tubes. Change the cylinders and adjust the challenge concentration as outlined above. Note the time for placement and continue the test to completion. Check and record the temperature and relative humidity in the challenge tube daily. Adjust as necessary.

Obtain the time and outlet gas concentration data, and calculate the removal efficiency and capacity for removal according to the following equations:

REMOVAL EFFICIENCY (%)=(($C1_t - C2_t$)×100)/$C1_t$ where $C1_t$=challenge gas concentration (in ppm) at time "t."
$C2_t$=outlet gas concentration (in ppm) at time "t."

CAPACITY FOR REMOVAL (WEIGHT %)=

CAPACITY FOR REMOVAL (WEIGHT %) =

$$\sum_{t=1}^{n} \frac{C1_t \times E_t \times MW \times V \times (60 \min/hr)}{10_6 \times (24{,}450 \text{ ml/mole}) \times W}$$

where:

n=hours since test start (for cumulative weight %) or hours to test completion (for total weight %).
$C1_t$=challenge gas concentration (in ppm) at time "t."
$E_t$=removal efficiency at time "t."
MW=molecular weight of challenge gas.
V=airflow rate (in ml/min).
W=media sample weight (in gm).

EXAMPLE 8

Efficiency of Potassium Permanganate Impregnated Alumina Pellets.

The results of efficacy tests comparing the efficiency of removal of hydrogen sulfide by solid filtration media of the prior art and of the present invention are illustrated in FIG. 1. The efficiency tests were performed as described in Example 7, wherein solid filtration media comprising 4.4% potassium permanganate, and solid filtration media containing 8.4% potassium permanganate were analyzed. The compositions of the analyzed media, by weight, are as follows:

| % $KMnO_4$ | % $H_2O$ | % $NaHCO_3$ | % Alumina |
|---|---|---|---|
| 8.4 | 24.4 | 17 | 50.2 |
| 4.4 | 19.9 | 17 | 58.7 |

FIG. 1 illustrates the efficiency of hydrogen sulfide removal of each of the media over an extended period of time. As can be seen from FIG. 1, the media comprising 8.4% potassium permanganate has a percent efficiency of hydrogen sulfide removal of 96% at 260 hours, 78% at 456 hours, and 54% at 600 hours. In contrast, the solid filtration media comprising 4.4% potassium permanganate has a hydrogen sulfide removal efficiency of approximately 92% at 260 hours, 42% at 456 hours, and 15% at 600 hours.

EXAMPLE 9

An alternative method of preparing potassium permanganate impregnated alumina composition,s prepared as follows:

A dry feed mix is prepared by combining, by weight, 75 to 85% alumina, 7 to 12% finely divided potassium permanganate, and 10 to 20% sodium bicarbonate. The dry feed mixture is sprayed with water while the dried feed mix is being tumbled in a tumble mill. The resulting pellets are then dried at 130° to 140° F., until the pellets contain about 20 to 25% free water. It is to be understood that the dry feed mix is rolled in the pelletizing disc as described in U.S. Pat. No. 3,226,332, while it is being sprayed with water. It is also to be understood that the dry feed mix may contain less potassium permanganate, and the water which is sprayed on the dry feed mix may contain the corresponding amount of potassium permanganate to yield the same final concentration of potassium permanganate as when all of the potassium permanganate is in the dry feed mix. If such a method is utilized, the aqueous potassium permanganate solution preferably is to be heated to approximately 180° to 190° F.

The invention having been fully described by the above-detailed description and accompanying examples, other variations of, and uses for the present invention will become apparent to one skilled in the art. All such variations and uses are intended to be encompassed by the appended claims.

What is claimed is:

1. A method of treating a contaminated fluid stream containing hydrogen sulfide, comprising contacting the contaminated fluid stream with a solid filtration composition such that the hydrogen sulfide is removed from the contaminated fluid stream, wherein the solid filtration composition consists essentially of at least approximately 7% potassium permanganate by weight of the composition; at least approximately 10% water by weight of the composition; sodium bicarbonate, and activated alumina.

2. The method of claim 1, wherein the concentration of potassium permanganate is between approximately 7 and 12% by weight of the composition.

3. The method of claim 1, wherein the concentration of sodium bicarbonate is approximately 30% by weight of the composition or less.

4. The method of claim 1, wherein the concentration of sodium bicarbonate is between approximately 15 and 20% by weight of the composition.

5. The method of claim 1, wherein the water concentration is between 10% and 35%.

6. The method of claim 1, wherein the hydrogen sulfide capacity of the solid filtration composition is at least 13%.

7. A method of treating a contaminated fluid stream containing hydrogen sulfide, comprising contacting the contaminated fluid stream with a solid filtration composition such that the hydrogen sulfide is removed from the contaminated fluid stream, wherein the solid filtration composition is produced by the process comprising the steps of: forming a mixture consisting essentially of water, potassium permanganate, sodium bicarbonate, and activated alumina; forming the mixture into at least one cohesive porous unit; and curing the unit at a temperature of from about 100° F. to about 200° F., until the concentration of water is at least approximately 10% by weight of the composition, and the concentration of potassium permanganate is at least about 7% by weight of the composition.

8. The method of claim 7, wherein the unit is cured until the concentration of potassium permanganate is from about 7% to about 12% by weight of the composition.

9. The method of claim 7, wherein the unit is cured until the concentration of potassium permanganate is from about 7% to about 12% by weight of the composition, and the concentration of sodium bicarbonate is between approximately 15 and 20% by weight of the composition.

10. The method of claim 7, wherein the unit is cured until the concentration of sodium bicarbonate is approximately 30% by weight of the composition or less.

11. The method of claim 7, wherein the water concentration is between 10% and 35%.

12. The method of claim 7, wherein the hydrogen sulfide capacity of the solid filtration composition is at least 13%.

* * * * *